INDEXING DEVICE

Filed March 14, 1957

INVENTOR.
Frederick W. Pfleger
BY
Morris Rabkin
ATTORNEY.

United States Patent Office 2,906,200
Patented Sept. 29, 1959

2,906,200

INDEXING DEVICE

Frederick W. Pfleger, Pennsauken, N.J., assignor to Radio Corporation of America, a corporation of Delaware Application March 14, 1957, Serial No. 646,042
9 Claims. (Cl. 101—93)

This invention applies to data processing, and more particularly to a device for indexing the control circuit of a high speed output printer.

In the field of data processing, large volumes of information must be converted from a "language" understood by computers or other information handling machines into printed characters recognizable by the human operators. One such type of output device, for example, is a high speed, line-at-a-time printer. Such printers are described by J. C. Hosken in the "Review of Input and Output Equipment Used in Computing Systems," Joint AIEE-IRE-ACM Computer Conference, published March 1953 by the AIEE, page 108. The printers described therein utilize timing circuits for ascertaining the relative location of the individual characters of the print wheels. Most printers of this type have a plurality of timing markers and an index marker timed with the shaft driving the print wheels. Each of the timing markers corresponds to one character on the print wheel and controls triggering impulses for printing that corresponding character during a print shaft revolution.

In printers of the prior art, one shaft revolution is allotted to the printing of a line, and, during a second shaft revolution, the paper advances and the signals representing the contents of a line to be printed are entered into the printer memory. In a typical printer, the print shaft is operated at 20 revolutions per second in order to provide an output of 10 printed lines per second. At such speeds, the printing may become faint and blurred and character alignment may require critical adjustments. It is desirable to retain the output rate and yet provide better printed impressions.

It is an object of the present invention to improve the printing quality of an on-the-fly printer without decreasing the output rate.

It is a further object of the invention to improve the print quality of an on-the-fly output printer by a reduction in peripheral speed of the print wheels.

It is a still further object of the invention to increase the output rate of an on-the-fly printer without sacrifice of print character quality.

According to a preferred embodiment of the present invention, two index mark detectors are provided respectively for two index marker signals that are 180° out of phase with each other for each cycle. A logic circuit and counters are arranged so that a print cycle may be initiated with the index marker at either of the two detectors. The printing cycle is allotted one print shaft revolution, but only one-half of a revolution need be provided during which paper advances and the printer memory is filled. Any detection of the index marker after the paper has advanced and the memory is filled initiates a printing cycle.

In a preferred embodiment of the present invention, the printed output rate is as before. Formerly this output rate required two print shaft cycles per line. By use of the present invention one and one-half cycles per line on the average suffice. The time formerly spent in waiting for the complete shaft revolution after paper advance is consumed by rotating the print wheels more slowly, reducing print shaft speeds by one-fourth, thus improving the quality of printed impressions. In an alternative embodiment, the print shaft revolution rate is as before, and the lines-per-second output rate is increased by one-third.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
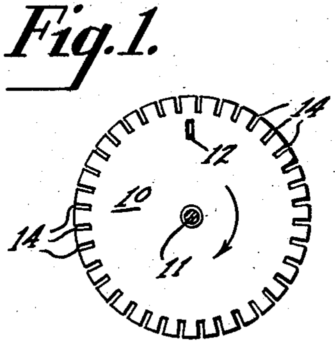
Figure 1 is a front view of an indexing and timing device suitable for use in the present invention.
Figure 2:
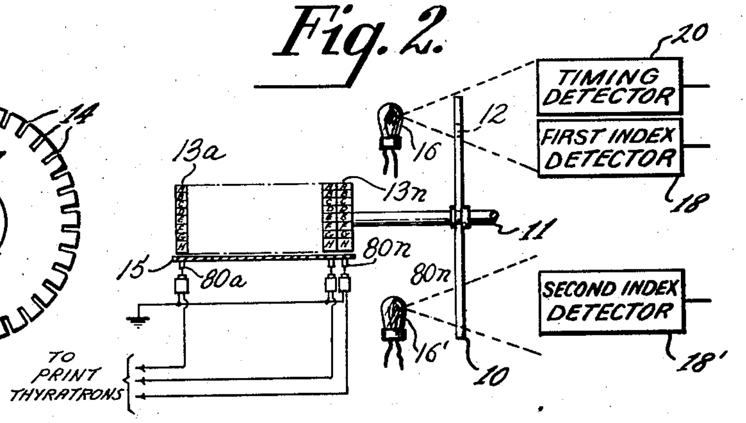
Figure 2 is a partial view of the print wheels and a side view of the device of Figure 1.

In the timing pulse generator of Figures 1 and 2, a slotted disc 10 is mounted on the printer shaft 11 which may also carry the print wheels 13*a*—*n*. An index slit 12 serves as a reference or indexing marker. A plurality of timing slits 14 are radially disposed about the periphery of the disc, each slit 14 corresponding to a different character on the print wheels. The index slit 12 is placed at an intermediate radial distance from the center of the disc 10 and is located angularly between two of the timing slits 14. The index slit 12 may be assigned a location timed to produce a pulse in advance of the first character pulse. In one embodiment, each print wheel has 45 characters disposed about the periphery. The index pulse is generated after the 45th timing pulse and before the 1st pulse.

A light source 16 (best seen in Figure 2) is placed at one side of the disc 10. A first photocell index detector 18 and a photocell timing detector 20 are placed on the side of the disc 10 opposite and facing the light source 16. A second light source 16' is placed in diametric opposition to the first source 16, and a second photocell index detector 18' is mounted on the side of the disc 10 opposite, and facing, the second source 16'.

Through gating and counting circuitry described below in connection with Figure 3, the timing control function is transferred between the two photocell index detectors 18, 18'. During one print shaft 11 revolution, the first index detector 18 may provide an initiating signal upon detection of the index slit 12. The subsequent timing pulses then control the print-out. At the end of the print cycle the first index detector 18 again initiates an index pulse which may control the paper advance and the filling of the printer memory, which may consume one-half of a revolution of the disc 10 and print shaft.

The index slit 12 next generates a pulse at the second index detector 18' providing a signal to commence a second printing cycle. Printer control circuits such as may control a printer modified according to the present invention have been described by Don Flechtner and Carl G. Eckel in an application for patent, Serial No. 440,831, entitled "Printer Control Systems," filed July 1, 1954, and assigned to the assignee of the present invention.

Figure 3:
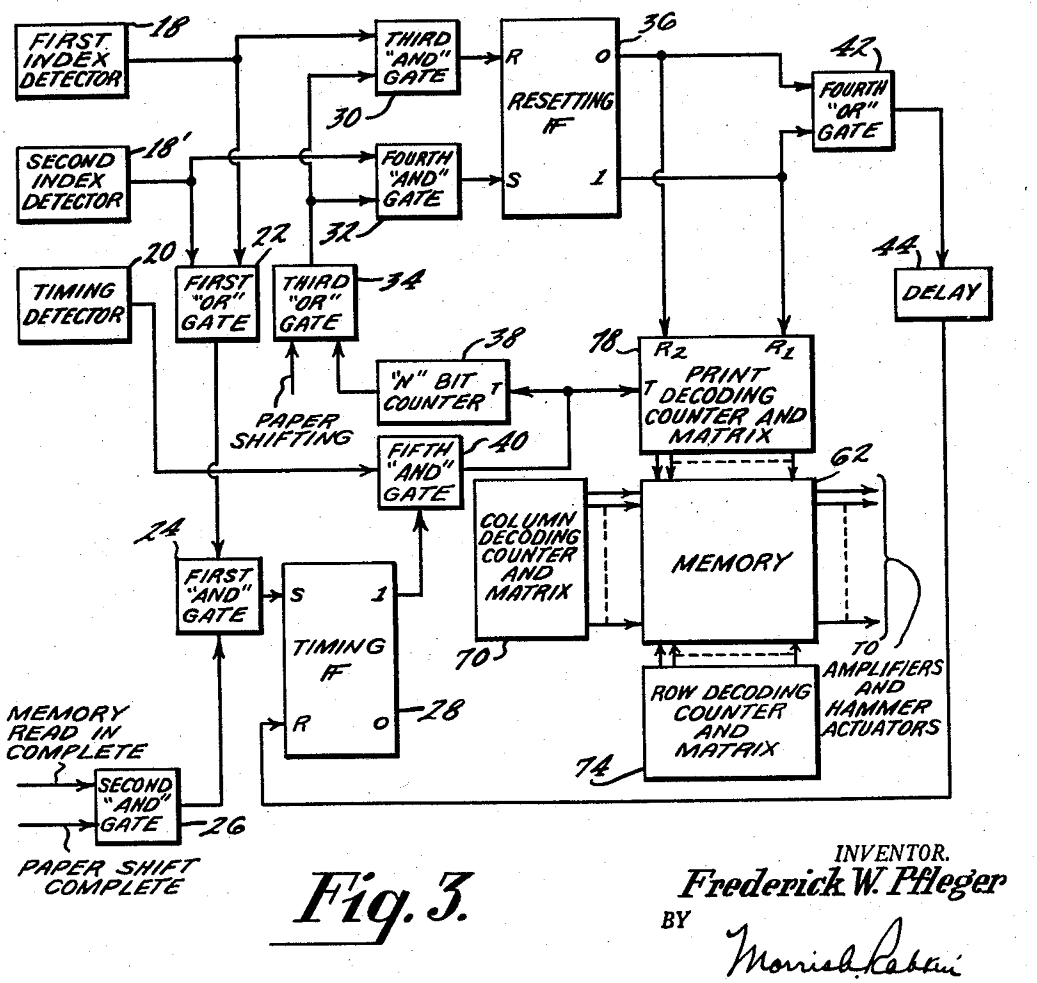
Figure 3 is a block diagram of a counting and control circuit suitable for use in the present invention.

In the circuits of Figure 3, the outputs of the first and second photocell index detectors 18, 18' are both applied to a first two-input "or" gate 22 whose output is applied to a first two-input "and" gate 24. The second input to the first "and" gate 24 is connected to the output of a second "and" gate 26 which is connected to signal sources within the printer circuits (not shown) indicating respectively that the shifting of paper and the memory read-in have been completed. The output of the first "and" gate 24 connects to the set terminal S of a timing flip-flop 28.

The outputs of the first and second index detectors 18, 18′ are further applied respectively to third and fourth two-input "and" gates 30, 32. A third two-input "or" gate 34 provides an enabling signal to the second inputs of the third and fourth "and" gates 30, 32. The outputs of the third and fourth "and" gates 30 and 32 connect respectively to the reset terminal R and the set terminal S of a resetting flip-flop 36.

One input to the third "or" gate 34 is connected to the output of a signal source within the printer circuits (not shown) indicating that paper is being shifted. The second input to the third "or" gate 34 is a signal from an N-bit counter 38. The N-bit counter 38 is a recycling counter having a capacity equivalent to the number of timing slits 14 on the disc 10. In the present example, there are 45 timing slits 14. The index slit 12 is placed between marking slits Nos. 45 and 1. The N-bit counter applies a signal to the third and fourth "and" gates 30, 32 through the third "or" gate 34 at the 43rd, 44th and 45th counts.

The "one," or (1) output terminal of the timing flip-flop 28 connects to one input of a fifth two-input "and" gate 40, the second input of which is connected to the timing detector 20. The output of the fifth "and" gate 40 is applied to trigger the N-bit counter 38 and to trigger a print decoding counter and matrix 78. Suitable memory addressing, reading, and writing circuits are shown in greater detail in the Flechtner-Eckel application cited above. For ease in reference, the core memory 62 and the decoding matrixes 70, 74, 78 are numbered here with the same reference numerals as in the said application, in order to identify more precisely the corresponding components. The manner of interconnecting these components will be obvious to one skilled in the art.

The print decoding counter and matrix 78 has two resetting terminals, $R_1$ and $R_2$, which reset the counter to the non-consecutive counts of 0 and 22 respectively. The outputs of the resetting flip-flop 36 are connected to the resetting terminals, $R_1$ being connected to the (1) output and $R_2$ being connected to the zero, or (0) output. Both the (0) and (1) outputs of the resetting flip-flop 36 are applied to a fourth two-input "or" gate 42, whose output is applied to a delay circuit 44. The delay circuit 44 output is connected to the reset terminal R of the timing flip-flop 28.

A high speed core memory unit 62 is connected with a column decoding counter and matrix 70 and a row decoding counter and matrix 74 in a manner described in greater detail in the above-mentioned Flechtner-Eckel application. The memory is filled by coincident addressing of appropriate row and column intersections. The memory is read out using a counter and matrix, a row-at-a-time, over a plurality of output channels, each applied respectively to an amplifier and a print thyratron (not shown). Each row in the memory 62 corresponds to a different character, and each row is addressed in synchronism with the print shaft 11 rotations. At the desired time in the rotational cycle of the printing shaft 11, according to the character to be printed, the different print hammers 80*a*—*n* are energized.

To describe a typical printing operation, it may be assumed initially that the paper 15 has been shifted into position and the memory 62 has been filled, so that a signal passes through the second "and" gate 26. The index slit 12 approaches the first index detector 18. The print decoding counter and matrix 78 have been reset to zero and the timing flip-flop 28 has also been reset.

The index pulse is generated at the first index detector 18 and is applied to the first "or" gate 22 and the third "and" gate 30. The index pulse passes through the first "or" gate 22 and the first "and" gate 24, which is enabled by the output of the second "and" gate 26. The index pulse sets the timing flip-flop 28, enabling the fifth "and" gate 40 to pass timing pulses from the timing detector 20. Timing pulses trigger the print decoding counter and matrix 78 and also the N-bit counter 38.

As in the above-mentioned Flechtner-Eckel application, the contents of the memory 62 are read out, a row at a time, under control of the timing pulses, on 120 separate output lines, one for each character position in the printed line. At each timing pulse, the corresponding character is printed wherever it occurs in the line by a pulse to the print thyratrons in each of the columns to be printed.

During the printing cycle, the index slit 12 passes the second index detector 18′ and an index pulse is again produced. This pulse is transmitted through the still enabled first "and" gate 24 to the already set counter flip-flop 28 and, therefore, has no effect. The index pulse applied to the fourth "and" gate 32 is blocked as the gate is disabled, because the count in the N-bit counter in this example has not reached N–2 or 43.

The print wheels and timing disc 10 complete the revolution. At the N–2 or 43rd count, the N-bit counter 38 enables the third and fourth "and" gates 30, 32 and the gates stay enabled through the count to 1. The index slit 12 is detected at the first index detector 18, after the 45th and before the 1st timing pulse. The index pulse from the first detector 18 is gated through the enabled third "and" gate 30 to reset the resetting flip-flop 36. The (0) output of the resetting flip-flop 36 pulses the $R_2$ terminal of the print decoding counter and matrix 78, resetting the counter to a 22 count. The (0) output then passes through the fourth "or" gate 42 and the delaying means 44 to reset the timing flip-flop 28, thereby disabling the fifth "and" gate 40. The delaying means 44 is included to assure that the output of the first "and" gate 24 is applied to set the timing flip-flop 28 before the resetting impulse arrives.

The paper shifting circuits (not shown) advance the paper 15. During the advance a signal is applied to the third "or" gate 34, maintaining the third and fourth "and" gates 30, 32 in an enabled condition. The second "and" gate 26 is disabled so long as the paper continues to shift, and subsequent index pulses pass alternately through the third and fourth "and" gates 30, 32, resetting and setting the resetting flip-flop 36 respectively. The print decoding counter and matrix 78 is correspondingly reset alternately to the 22 count and the 0 count.

When the paper is advanced and the memory 62 is refilled, a printing cycle again occurs. If, for example, the index pulse is next generated by the second index detector 18′, the resetting flip-flop 36 is in the set condition and the print decoding counter and matrix 78 is reset to the 22nd character position. The index pulse generated by the second index detector 18′ is gated through the first "and" gate 24, setting the timing flip-flop 28. The third and fourth "and" gates 30, 32 are disabled. The timing pulses are gated through the enabled fifth "and" gate 40 and are applied to the N-bit counter 38 and the print decoding counter and matrix 78.

The memory 62 is again read out, starting this time with the 22nd row (which corresponds to the character in print position). The print decoding counter and matrix 78 recycles at the 45 count and continues to count up to 22. When the N-bit counter reaches 43, the print decoding counter and matrix 78 has reached 20 and the third and fourth "and" gates 30, 32 are enabled. The index slit 12 is again recognized at the second index detector 18′ and the fourth "and" gate 32 output sets the resetting flip-flop 36 to a zero count.

At the completion of the 45th count, the application of the index pulse results in the resetting of the timing flip-flop 28 to close the fifth "and" gate 40 to further timing pulses. The paper 15 is again shifted and the memory 62 is again refilled. If the paper is still shifting as, for example, during a multiple line shift, at the occurrence of the index pulse from the first index detector 18, the third "and" gate 30 is pulsed to reset the resetting flip-flop 36 and to reset the print decoding counter and matrix 78 to the 22 count.

Whenever the memory is full and the paper is not shifting, the printer is ready to print a line, without waiting for the print wheels to complete a full revolution. The index pulse detector that signals the index slit also controls the location from which memory read-out starts, maintaining the correspondence between print characters and character positions in the memory 62.

In a typical on-the-fly printer, whose normal output rate is 10 lines per second corresponding to a print shaft speed of 1200 r.p.m., the present invention could either permit increase of the printing rate to 13⅓ lines per second at an unchanged print shaft rate, or, alternatively, could permit a slow down of the print shaft from 1200 r.p.m. to 900 r.p.m. and maintain the output rate of 10 lines per second.

It may be seen that additional index detectors may be added with additional logical circuitry to permit further time savings during the memory refill and paper advance.

What is claimed is:

1. An indexing device comprising a rotatable member, means for generating a plurality of index pulses each corresponding to a different possible initial reference position of said member, means for generating a plurality of timing pulses each corresponding to a different reference position of said member, counting means for counting said timing pulses to indicate the angular position of said member, and resetting means responsive to said index pulses for resetting said counting means to a count corresponding to one said initial reference position different from that corresponding to the index pulse which initiates said resetting.

2. In a printer, means for generating a plurality of index pulses each corresponding to a different possible initial printing position, counting means providing an output corresponding to the instant printing position, and resetting means connected to said generating means and to said counting means and responsive to said index pulses to reset said counting means to a count corresponding to one said initial printing position other than that corresponding to the resetting index pulse.

3. In a printer, means for generating a plurality of index pulses each corresponding to a different possible initial printing position, a counter having a number of consecutive counts greater in number than said indexing pulses, each of said counts corresponding to a different printing position, and resetting means connected to said generating means and to said counting means and responsive to said index pulses to reset said counting means to a count different from that corresponding to the next succeeding printing position.

4. In combination with a printer having a means for generating timing pulses each corresponding to a different character in print position, means for generating a plurality of index pulses each corresponding to a different possible initial print position, first counting means enabled by said index pulses for counting subsequent timing pulses, second counting means responsive to said timing pulses for providing a count corresponding to the character in print position, and means responsive to said index pulses and said first counting means for resetting said second counting means to a count corresponding to one of said index pulses other than the one which causes said resetting.

5. In combination with a printer having a means for generating timing pulses each corresponding to a different character in print position, means for generating a plurality of index pulses each corresponding to a different possible initial print position, first counting means enabled by said index pulses for counting subsequent timing pulses, second counting means for providing consecutive counts corresponding to different characters in print position, and means responsive to said index pulses and said first counting means for resetting said second counting means to a non-consecutive count corresponding to one of said index pulses.

6. In a printer, means for generating a plurality of index pulses including a plurality of index mark detectors, each of said index pulses corresponding to a different possible initial printing position, means for generating a plurality of timing pulses, each corresponding to a different character in printing position, gate means connected to said timing pulse means and enabled by said index pulses for applying triggering pulses, a first counter responsive to said triggering pulses for providing consecutive counts corresponding to the number of character positions, a second counting means responsive to said triggering pulses for providing consecutive counts respectively corresponding to characters in printing position, and resetting means responsive to said index pulses and said first counting means for resetting said second counting means to a count corresponding to one said initial printing position other than that corresponding to the resetting index pulse.

7. An indexing device comprising a rotatable member having a plurality of position markers, means including said markers for generating index and timing pulses as said member rotates, counting means responsive to said timing pulses for indicating the position of said member, and resetting means responsive to said index pulses for resetting said counting means to a count corresponding to a predetermined position of said member other than that corresponding to the position at which the resetting index pulse occurs.

8. The combination comprising a print wheel having a font of characters disposed above its periphery, said wheel having a plurality of different possible initial printing positions, means for generating an index pulse when said wheel is in any of said initial positions, means for generating a timing pulse each time a different one of said characters is moved into printing position, a counter responsive to each said timing pulse for indicating which of said characters is in printing position, and counter resetting means responsive to each said index pulse for resetting said counter to a count corresponding to one of said initial printing positions other than that one represented by the resetting index pulse.

9. In combination with an array of rotatable print wheels each having a font of characters disposed about its periphery, an indexing device comprising a rotatable member driven in synchronism with said wheels, said array having a plurality of different possible initial printing positions, means including said member for generating an index pulse when said wheel is in one of said initial printing positions, a counter for indicating the position of said wheel, and counter resetting means responsive to each said index pulse for resetting said counter to a count indicative of one of said initial printing positions other than the one corresponding to the resetting index pulse.

References Cited in the file of this patent

UNITED STATES PATENTS 2,714,843 Hooven ---------------- Aug. 9, 1955